US011915139B2

(12) United States Patent
Yoon et al.

(10) Patent No.: US 11,915,139 B2
(45) Date of Patent: Feb. 27, 2024

(54) MODIFYING MACHINE LEARNING MODELS TO IMPROVE LOCALITY

(71) Applicant: Google LLC, Mountain View, CA (US)

(72) Inventors: Doe Hyun Yoon, Foster City, CA (US); Nishant Patil, Sunnyvale, CA (US); Norman Paul Jouppi, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 86 days.

(21) Appl. No.: 17/672,163

(22) Filed: Feb. 15, 2022

(65) Prior Publication Data

US 2022/0172060 A1 Jun. 2, 2022

Related U.S. Application Data

(63) Continuation of application No. 16/156,573, filed on Oct. 10, 2018, now Pat. No. 11,263,529.

(51) Int. Cl.
*G06N 3/08* (2023.01)
*G06N 3/082* (2023.01)
(Continued)

(52) U.S. Cl.
CPC ............. *G06N 3/082* (2013.01); *G06N 3/084* (2013.01); *G06N 3/10* (2013.01)

(58) Field of Classification Search
CPC ........... G06N 3/082; G06N 3/084; G06N 3/10
See application file for complete search history.

(56) References Cited

U.S. PATENT DOCUMENTS 5,664,191 A 9/1997 Davidson et al.
7,826,396 B2 11/2010 Miller et al.
(Continued)

FOREIGN PATENT DOCUMENTS

EP 3376441 9/2018
KR 20180069881 A 6/2018
(Continued)

OTHER PUBLICATIONS

Yang, Tien-Ju, et al. "NetAdapt: Platform-Aware Neural Network Adaptation for Mobile Applications." arXiv preprint arXiv: 1804. 03230v2 (2018). (Year: 2018).*
(Continued)

*Primary Examiner* — Benjamin P Geib
(74) *Attorney, Agent, or Firm* — Fish & Richardson P.C.

(57) ABSTRACT

Methods, systems, and apparatus for updating machine learning models to improve locality are described. In one aspect, a method includes receiving data of a machine learning model. The data represents operations of the machine learning model and data dependencies between the operations. Data specifying characteristics of a memory hierarchy for a machine learning processor on which the machine learning model is going to be deployed is received. The memory hierarchy includes multiple memories at multiple memory levels for storing machine learning data used by the machine learning processor when performing machine learning computations using the machine learning model. An updated machine learning model is generated by modifying the operations and control dependencies of the machine learning model to account for the characteristics of the memory hierarchy. Machine learning computations are performed using the updated machine learning model.

20 Claims, 7 Drawing Sheets

(51) Int. Cl.
G06N 3/084 (2023.01)
G06N 3/10 (2006.01)

(56) References Cited

U.S. PATENT DOCUMENTS

| | | | |
|---|---|---|---|
| 8,965,819 | B2 | 2/2015 | Tirunagari |
| 10,019,668 | B1 | 7/2018 | Woo |
| 2006/0212654 | A1 | 9/2006 | Balakrishnan |
| 2016/0342888 | A1 | 11/2016 | Yang et al. |
| 2017/0124454 | A1 | 5/2017 | Vasudevan |
| 2017/0161604 | A1 | 6/2017 | Craddock et al. |
| 2018/0204117 | A1 | 7/2018 | Brevdo |
| 2019/0392287 | A1* | 12/2019 | Ovsiannikov ............ G06N 3/04 |

FOREIGN PATENT DOCUMENTS

| | | |
|---|---|---|
| TW | 201826140 | 7/2018 |
| WO | WO 2017/075346 | 5/2017 |
| WO | WO 2017163442 | 1/2019 |

OTHER PUBLICATIONS

Chen, Xiaoming, Danny Z. Chen, and Xiaobo Sharon Hu. "moDNN: Memory optimal DNN training on GPUs." 2018 Design, Automation & Test in Europe Conference & Exhibition (DATE). IEEE, 2018. (Year: 2018).*
Anbar, Ahmad, et al. "Exploiting hierarchical locality in deep parallel architectures." ACM Transactions on Architecture and Code Optimization (TACO) 13.2 (2016): 1-25. (Year: 2016).*
Office Action in European Appln. No. 19752352.5, dated Mar. 2, 2023, 6 pages.
'www.ibm.com' [online] "Memory Locality," Jean Francois Puget, Jun. 5, 2014, [retrieved on Oct. 10, 2018] Retrieved from Internet: URL<https://www.ibm.com/developerworks/community/blogs/jfp/entry/memory_locality?lang=en> 4 pages.
Chen et al, "A flow-guided file layout for out-of-core streamline computation" Pacific Visualization Symposium, Feb. 2012, 8 pages.
Chi et al. "NXgraph: An Efficient Graph Processing System on a Single Machine," arXiv 1510.06916v1, Oct. 23, 2015, 12 pages.
Faerman et al. "LASAGNE: Locality and Structure Aware Graph Node Embedding," arXiv 1710.06520v1, Oct. 17, 2017, 21 pages.
Marculescu, Diana, Dimitrios Stannoulis, and Ernnao Cai. "Hardware-Aware Machine Learning: Modeling and Optimization." arXiv preprint arXiv:1809.05476 (2018). (Year: 2018).
Mukkara et al. "Cache-Guided Scheduling Exploiting Caches to Maximize Locality in Graph Processing," International Workshop on Architecture for Graph Processing, Jun. 2017, 8 pages.
PCT International Preliminary Report on Patentability in International Application No. PCT/US2019/043861, dated Apr. 8, 2021, 8 pages.

PCT International Search Report and Written Opinion in International Application No. PCT/US2019/043861, dated Nov. 5, 2011, 15 pages.
Stannoulis, Dimitrios, et al. "HyperPower: Power-and Memory-Constrained Hyper-Parameter Optimization for Neural Networks." arXiv preprint arXiv:1712.02446 (2017). (Year: 2017).
Tan, Mingxing, et al. "MnasNet: Platform-Aware Neural Architecture Search for Mobile. CoRR abs/1807.11626 (2018)." arXiv preprint arXiv:1807.11626 (2018). (Year: 2018).
TW Office Action in Taiwan Application No. 108128203, dated Jul. 7, 2020, 44 pages (with English translation).
Venkataraman. "System Design for Large Scale Machine Learning," Technical Report No. UCB/EECS-2017-219, Dec. 15, 2017, Electrical Engineering and Computer Science University of California at Berkeley, 109 pages.
Yang, Tien-Ju, et al. "NetAdapt: Platform-Aware Neural Network Adaptation for Mobile Applications." arXiv preprint arXiv: 1804.03230 (2018). (Year: 2018).
Yu et al. "IMP: Indirect memory Prefetcher," ACM, Dec. 2015, 13 pages.
Yu, Jiecao, et al. "Scalpel: Customizing dnn pruning to the underlying hardware parallelism." ACM SIGARCH Computer Architecture News 45.2 (2017): 548-560. (Year: 2017).
Zhang et al. "Making Caches Work for Graph Analytics," arXiv1608.01362v4, Jan. 12, 2018, 10 pages.
Notice of Allowance in Korean Appln. No. 10-2022-7038854, dated Jul. 11, 2023, 6 pages (with English translation).
Bang et al., "A 288μW Programmable Deep-Learning Processor with 270KB On-Chip Weight Storage Using Non-Uniform Memory Hierarchy for Mobile Intelligence" ISSCC-IEEE International Solid-State Circuits Conference / Session 14, 2017, 250-252.
Notice of Allowance in Canadian Appln. No. 3,101,214, dated Apr. 14, 2023, 1 page.
Office Action in Brazilian Appln. No. 1120200243531, dated Apr. 6, 2023, 6 pages (with English translation).
KR Notice of Allowance in Korean Appln. No. 10-2020-7034304, dated Sep. 26, 2022, 4 pages (with English Translation).
Chen et al., "TVM: An Automated End-to-End Optimizing Compiler for Deep Learning," arXiv, Oct. 5, 2018, 16 pages.
JP Notice of Allowance in Japanese Application No. 2020-566754, dated Apr. 4, 2022, 6 pages (with Machine Translation).
Kenshi et al., "Directing and replacing in-memory caches based on data-dependent graphs in Apache Spark," SIG Technical Reports, Feb. 20, 2018, 2018-OS-142(15), 11 pages (with English Abstract).
Qiao et al., "MR-Graph: A Customizable GPU MapReduce," Proceedings of the 2015 IEEE 2nd International Conference on Cyber Security and Cloud Computing, Nov. 5, 2015, pp. 417-422.
Office Action in Japanese Appln. No. 2022-082336, dated Jun. 20, 2023, 4 pages (with English translation).
Office Action in Japanese Appln. No. 2022-082336, dated Dec. 5, 2023, 5 pages (with English Translation).

* cited by examiner

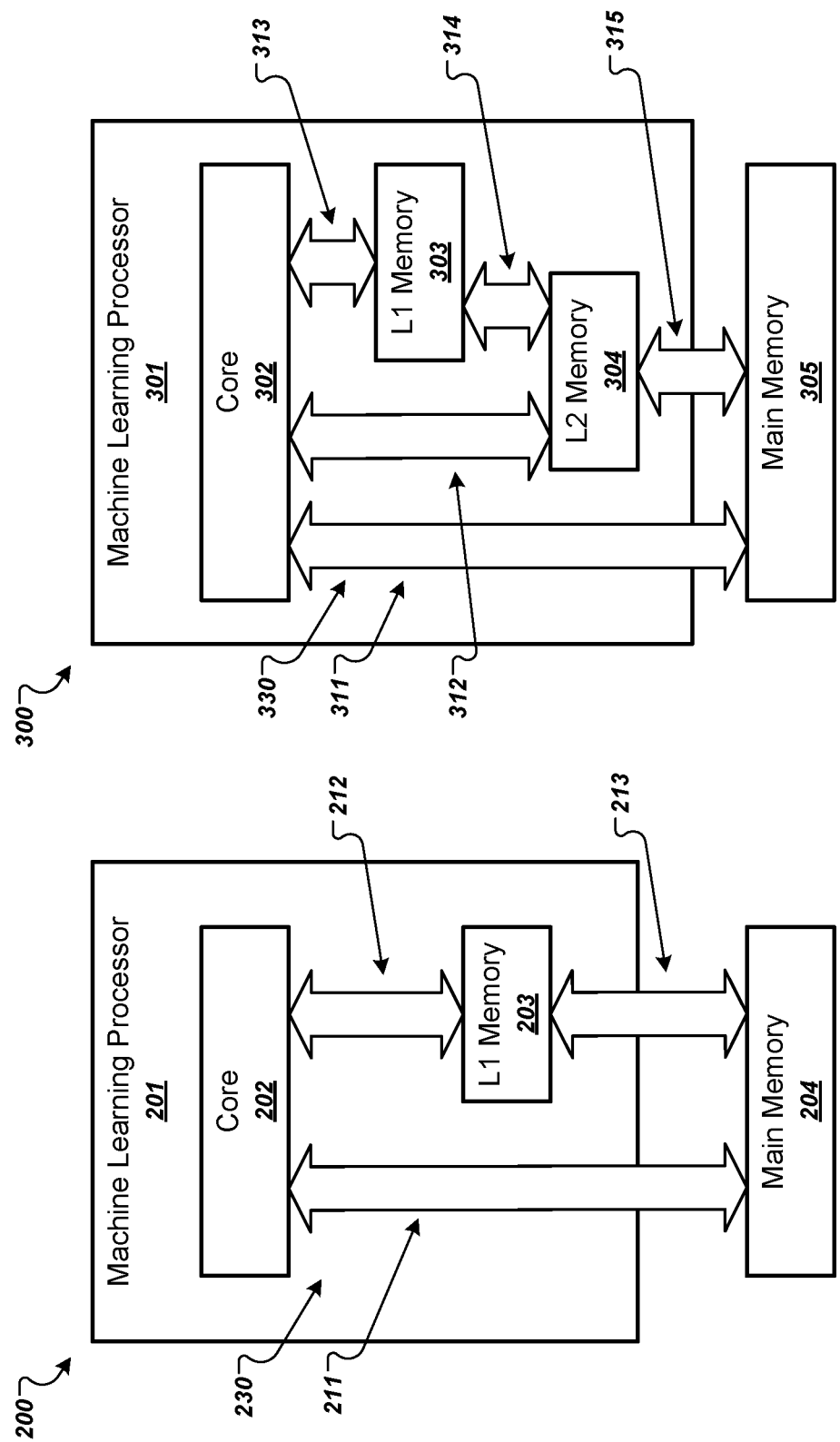

MODIFYING MACHINE LEARNING MODELS TO IMPROVE LOCALITY

CROSS-REFERENCE TO RELATED APPLICATION

This is a continuation of U.S. application Ser. No. 16/156,573, filed on Oct. 10, 2018, the disclosure of which is considered part of and is incorporated by reference in the disclosure of this application.

BACKGROUND

This specification generally relates to modifying machine learning models based on characteristics of memory to improve locality.

Neural networks are machine learning models that employ one or more layers of models to generate an output, e.g., a classification, for a received input. Some neural networks include one or more hidden layers in addition to an outer layer. The output of each hidden layer is used as input to the next layer in the network, i.e., the next hidden layer or the output layer of the network. Each layer of the network generates an output from a received input in accordance with current values of a respective set of parameters.

A neural network can be represented as a graph with nodes and edges. A node can represent an operation that can have zero or more inputs and zero or more outputs. An edge can represent data and/or control dependencies among operations. A machine learning processor can execute the graph repeatedly with different data (typically, a batch of input samples at a time). For each operation, the machine learning processor can obtain input data from memory and store the output data in memory.

SUMMARY

This specification describes technologies relating to improving locality of machine learning models and using the improved models to perform machine learning computations.

In general, one innovative aspect of the subject matter described in this specification can be embodied in a method that includes receiving data of a machine learning model. The data can represent operations of the machine learning model and data dependencies between the operations. Data specifying characteristics of a memory hierarchy for a machine learning processor on which the machine learning model is going to be deployed is received. The memory hierarchy can include multiple memories at multiple memory levels for storing machine learning data used by the machine learning processor when performing machine learning computations using the machine learning model. The characteristics can include a data storage capacity of each memory and a memory bandwidth of each memory. At least one of the memories can have a different memory bandwidth than at least one other memory. An updated machine learning model can be generated based on the data of the machine learning model and the characteristics of the memory hierarchy. The updated machine learning model can be generated by modifying the operations and control dependencies of the machine learning model to account for the characteristics of the memory hierarchy. Machine learning computations can be performed using the updated machine learning model.

These and other implementations can each optionally include one or more of the following features. In some aspects, the data of the machine learning model can include a graph that represents the operations of the machine learning model, the control dependencies between the operations, and data dependencies between the operations.

In some aspects, generating the updated machine learning model can include selecting, for at least a portion of the operations, one of the memories to store outputs of the operation based on when the outputs will be used as inputs to another operation.

In some aspects, generating the updated machine learning model can include determining that output data for a first operation is to be stored in a first memory of the multiple memories based on when the output data for the first operation will be used as input by a second operation. The first memory can have a lower memory bandwidth than a second memory of the multiple memories. In response to the determining, the updated machine learning model can include first control data that causes the machine learning processor to store the output data for the first operation in the first memory after the output data is generated by the first operation, and second control data that causes the machine learning processor to transfer the output data from the first memory to the second memory prior to the output data being used as input to the second operation.

In some aspects, the second control data causes the machine learning processor to transfer the output data from the first memory to the second memory in response to a third operation being executed. The third operation can be different from the first and second operations. Determining that output data for a first operation is to be stored in a first memory of the multiple memories based on when the output data for the first operation will be used as input by a second operation can include determining that the output data for the first operation is to be stored in the first memory based on at least one of (i) a number of operations that will be executed between the first operation and the second operation or (ii) an estimated duration of time between when the first operation will be executed and the second operation will be executed.

In some aspects, generating the updated machine learning model can include determining that input data for a particular sequence of operations of the machine learning model requires more data storage capacity than a particular memory of the multiple memories. In response, the updated machine learning model can include multiple sequences of operations that include a same sequence of operations as the particular sequence of operations, first control data that causes the machine learning processor to split the input data into multiple portions of data, second control data that causes the machine learning processor to assign each portion of data to a respective sequence of operations of the multiple sequence of operations; and third control data that causes the machine learning processor to perform the multiple sequences of operations in series.

The subject matter described in this specification can be implemented in particular embodiments so as to realize one or more of the following advantages. Machine learning models can be modified based on characteristics of a memory hierarchy of a machine learning processor on which the models are to be implemented to improve locality of data access (e.g., locality in data placement and/or data movement), resulting in improved memory bandwidth (e.g., faster data accesses) and utilization of the memory. This improvement in memory bandwidth and memory utilization enables the machine learning processor to perform machine learning computations faster and more efficiently than using the original machine learning model.

The operations, data dependencies, and/or control dependencies of the machine learning models can be updated such that output data from operations that will be used sooner than other data can be stored in faster memory (e.g., higher bandwidth memory) than the other data. The operations and data and control dependencies can also be updated such that the other data is pre-fetched to the faster memory prior to the other data being accessed for use as input to another operation. This improves the speed at which data is accessed and improves the usage of the faster memory, e.g., by not wasting faster memory space to store data that is not being used in place of data that is being reused.

By updating machine learning models based on data specifying characteristics of a memory hierarchy, the locality for a machine learning model can be adapted to various memory hierarchies so that execution of the machine learning model can be improved for various machine learning processors or execution frameworks. Storing frequently used data (e.g., weights) on-chip or in other fast access memory enables faster loading of such data for machine learning computations.

Other implementations of this and other aspects include corresponding systems, methods, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

FIG. 2 is a block diagram of an example execution framework for a machine learning processor.

FIG. 3 is a block diagram of another example execution framework for a machine learning processor.

Like reference numbers and designations in the various drawings indicate like elements.

DETAILED DESCRIPTION

In general, the subject matter described in this specification relates to generating updated machine learning models to account for characteristics of a memory hierarchy for a machine learning processor on which the machine learning model is going to be deployed. A machine learning model can be updated by modifying operations, data dependencies, and/or control dependencies of the machine learning model to improve the locality of data access of the machine learning model based on the characteristics of the memory hierarchy. For example, the machine learning model can be modified to improve locality in data placement (e.g., store commonly used data in faster memory) and/or data movement (e.g., store data that will not be used for some time in slower memory and pre-fetch the data to faster memory prior to the data being used).

Machine learning models, such as neural networks, can be highly compute intensive with key kernel operations such as matrix multiplication and convolution. In addition, neural networks are evolving to be deeper and more complex. To meet this ever increasing demand, new accelerators (e.g., machine learning processors) with dense compute units (e.g., processor cores) are being introduced. Low memory bandwidth can limit the performance of the compute units e.g., by having idle compute units waiting for data from memory. The hardware-software techniques for improving locality in neural network execution described herein can increase memory access speeds, thereby increasing the speed at which the compute units perform machine learning computations.

Figure 1:
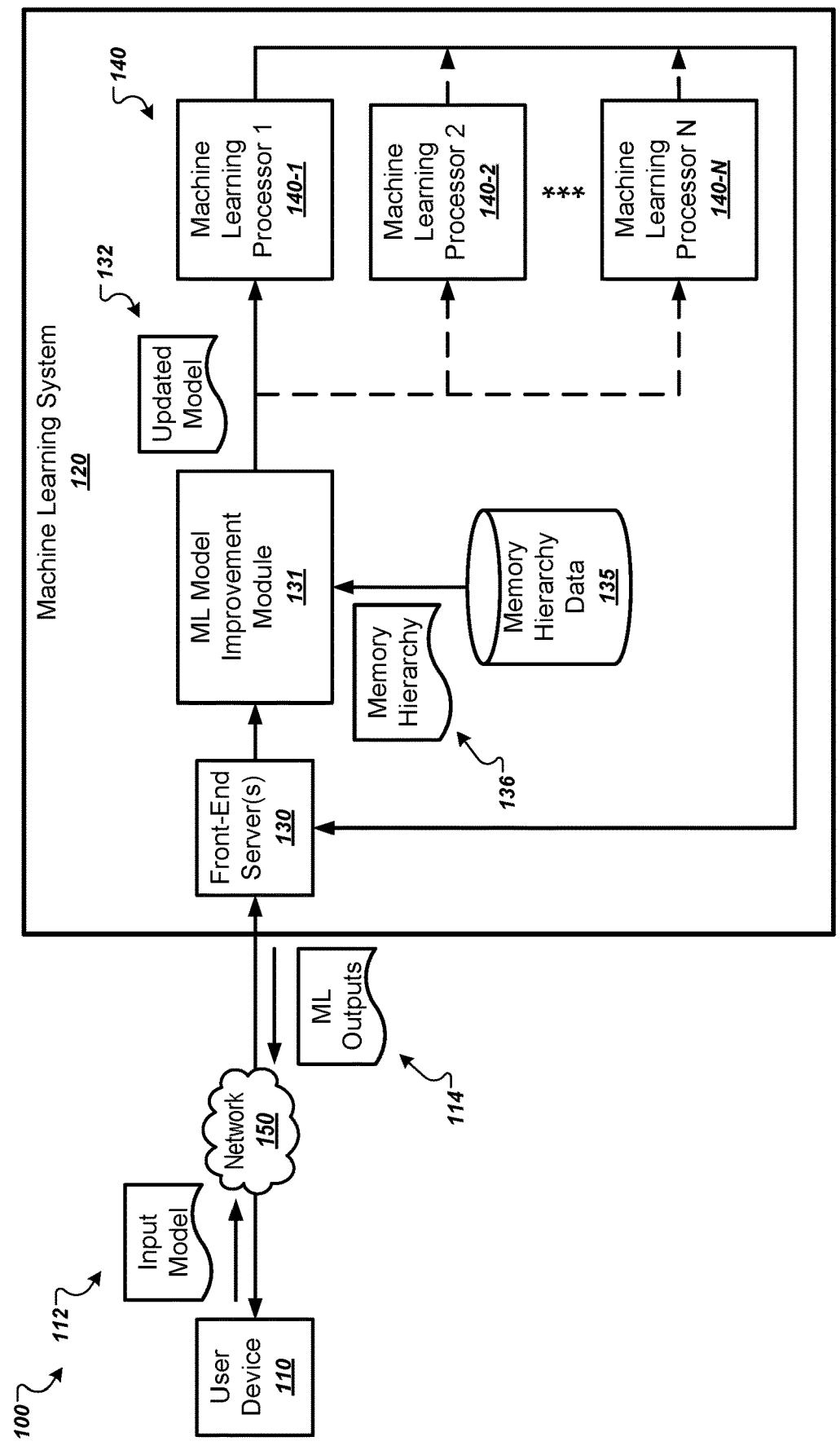
FIG. 1 is a block diagram of an example environment in which a machine learning system improves locality of machine learning models and performs machine learning computations using the improved machine learning models.

FIG. 1 is a block diagram of an example environment 100 in which a machine learning system 120 improves locality of machine learning models and performs machine learning computations using the machine learning models. The machine learning system 120 includes one or more front-end servers 130 that receives data of machine learning models 112 (e.g., neural networks or other appropriate machine learning models) from user devices 110 and provides machine learning outputs 114 (e.g., data output by machine learning models) to the user devices 110. The front-end servers 130 can communicate with the user devices 110 over a network 150, such as a local area network (LAN), a wide area network (WAN), the Internet, a mobile network, or a combination thereof.

The data of the machine learning model 112 can include data representing operations of the machine learning model and data dependencies between the operations. For example, the data of the machine learning model can include a graph that includes nodes that represent the operations and edges that represent the control dependencies (and/or data dependencies) between the operations. An edge that represents a data dependency indicates that an operation depends on the data from another operation (e.g., an operation will perform machine learning computations using the output data from another operation). An edge that represents a control dependency indicates that an operation depends on the execution of another operation (e.g., an operation is not performed until another operation is performed). The operations can be those that are necessary to perform a forward pass through the machine learning model, e.g., to compute an inference through the machine learning model. These operations can include, for example, matrix multiplication operations and/or convolution operations performed by the layers of a neural network. As another example, the operations can be those that are necessary to perform an iteration of a training process to train the machine learning model. These operations can include operations necessary to perform a forward pass through the machine learning model and also operations necessary to perform a backward pass through the machine learning model, i.e., backpropagation operations necessary to determine gradients with respect to the weights or parameters of the machine learning model.

The machine learning system 120 can improve the locality of the machine learning model, train the model, and execute the model to determine machine learning outputs (e.g., to classify input data). The machine learning system 120 includes a machine learning model improvement module 131 (also referred to as the improvement module 132 for brevity) that receives data of the machine learning models 112 and generates updated machine learning models 132 with improved locality (e.g., improved data re-use, locality in data placement, and/or locality in data movement). The improvement module 131 can update the machine learning model based on characteristics of a memory hierarchy for a machine learning processor on which the machine learning model is going to be deployed. That is, the model improvement module 131 generates an updated machine learning model 132 that has improved locality for the memory hierarchy of the machine learning processor on which the updated machine learning model 132 will be executed. The improvement module 131 can update neural networks and other appropriate machine learning model that can be represented as a collection of operations and dependencies between the operations using the techniques described herein.

For example, the machine learning system 120 includes N machine learning processors 140-1-140-N. Each machine learning processor 140 can have an associated memory hierarchy of memories that store machine learning data for the machine learning processor 140. Each memory hierarchy can include multiple memories at multiple memory levels. The memories can be configured to store machine learning data used by the machine learning processor 140 when performing machine learning computations using the machine learning model. For example, the machine learning data can include inputs to operations (e.g., input tensors), outputs from operations (e.g., output tensors), weights used by the operations, and/or other appropriate data used by a machine learning processor 140 when performing machine learning computations using a machine learning model.

Each level of the memory hierarchy can include one or more memories having common (or similar) characteristics. The characteristics of a memory can include a data storage capacity of the memory and a memory bandwidth of the memory. The memory bandwidth is the rate at which data can be read from or stored into the memory by a processor. The memory bandwidth can be expressed in units of bytes/second (or other appropriate data size per unit time measure). The characteristics of each memory can include characteristics of memory channels between the processor (e.g., a processor core) and the memory, such as direct or indirect, shared or dedicated, speed, etc.

The characteristics of the memories can differ for each level. For example, one level of memory can be faster (e.g., higher memory bandwidth) than the other levels. However, the other levels can have more data storage capacity than the one level with the fastest memory.

Data specifying the characteristics of the memory hierarchy for each machine learning processor 140 is stored in a memory hierarchy data storage unit 135. The characteristics of the memory hierarchy can include the characteristics of each memory in the memory hierarchy. When generating an updated machine learning model with improved locality, the improvement module 131 can obtain memory hierarchy data 136 specifying the characteristics of the memory hierarchy for the machine learning processor 140 on which the machine learning model is going to be deployed. For example, if a machine learning model is going to be executed by the machine learning processor 140-1, the improvement module 131 can obtain the characteristics of the memory hierarchy for the machine learning processor 140-1 from the memory hierarchy data storage unit 135.

The improvement module 131 can then generate the updated machine learning model 132 based on the input machine learning model 112 and the characteristics of the memory hierarchy specified by the memory hierarchy data 136. The updated machine learning model 132 can have the same functionality (or similar functionality) as the input machine learning model 112. That is, the updated machine learning model 132 performs the same task as the input machine learning model with the same or similar (e.g., within a threshold tolerance) accuracy and/or quality. For example, the updated machine learning model 132 can generate the same types of outputs as the input machine learning model 112 and output the same (or similar within a threshold tolerance) data that the input machine learning model 112 would output if both models were provided the same input data. However, the updated machine learning model 132 can have different orders of operations, different data dependencies between operations, and/or different control dependencies between operations than the input machine learning model 112.

Information that is required for execution of a machine learning model can be determined from the machine learning model. For example, as described above, a graph that represents a machine learning model can include nodes that represent operations and edges that represent data and/or control dependencies among operations. From the graph, the improvement module 131 can determine what data will be needed for each operation and when the operation will be executed. Using this information, the size of data for each input and each output of each operation (e.g., based on the size of an input tensor to the operation), and the characteristics of the memory hierarchy, the improvement module 131 can determine when and where to store input and output data for each operation.

For example, consider a memory hierarchy that includes L1 memory and main memory in which the L1 memory is faster than the main memory, but the L1 memory has a data storage capacity of 20 megabytes (MB) and main memory has a data storage capacity of 10 gigabytes (GB). If operation A and operation B both output 20 MB of data at the same time or close to the same time but the data output by operation A will be used as input by another operation immediately while the data output by operation B will not be used until several other operations are executed, the data output by operation A can be stored in the L1 memory and the data output by operation B can be stored in main memory. The data output by operation B can then be pre-fetched from main memory to L1 memory before being used as input to another operation. In this example, an updated machine learning model can include a new operation (or an annotation or other instruction or code) that causes the data output by operation B to be pre-fetched when another operation (e.g., operation C) is completed. Thus, the updated machine learning model can include a control dependency between operation C and the pre-fetching operation that triggers the pre-fetching operation after operation C is executed.

The improvement module 131 can generate each updated machine learning model 132 such that the data capacity of the various memories of the memory hierarchy are not over-utilized at any given time. For example, the improvement module 131 can determine, based on data of the input machine learning model 112 (e.g., a graph representing the model) when each operation will need input data (and its data size) and schedule (e.g., using control and data dependencies, new operations, order of operations, and/or annotations) the data between the memories such that each memory is at or below capacity. If the faster memory would be over capacity at any given time, the improvement module 131 can schedule some of the data at that time to be stored in slower memory.

The improvement module 131 can generate the updated machine learning model 132 for an input machine learning model 112 by modifying the operations of the model, modifying the control dependencies of the model, and/or modifying the data dependencies of model to improve the locality for the memory hierarchy. Modifying the operations can include adding operations that schedule the storage of data in memories. For example, the improvement module 131 can determine that the data output by an operation will not be used for at least a threshold number of intervening operations or for at least a threshold amount of time after the output data is generated. In response, the improvement module 131 can include, in the updated machine learning model 132, a first operation that causes the output data to be transferred to slower memory and a second operation that causes the data to be transferred back to faster memory prior to the data being used as input by another operation. The improvement module 131 can also include, in the updated machine learning model 132, a control dependency that causes the machine learning processor 140 to execute the second operation after a particular operation is executed. The improvement module 131 can select the particular operation that causes this pre-fetching of data based on a number of operations between the particular operation and the operation that will be using the data and an estimated amount of time needed to transfer the data from the slower memory to the faster memory such that the data transfer is completed before the operation needs the data.

The improvement module 131 can determine to store the output data in the slower memory based on the storage capacity and the amount of data storage required by other operations, in addition to when the output data will be needed by the other operation. For example, if the faster memory has sufficient data capacity for all of this data, the improvement module 131 can keep the output data in the faster memory. Thus, the decision on where to store data for a particular operation can be made based on the overall data storage requirements at the time.

Figure 8:
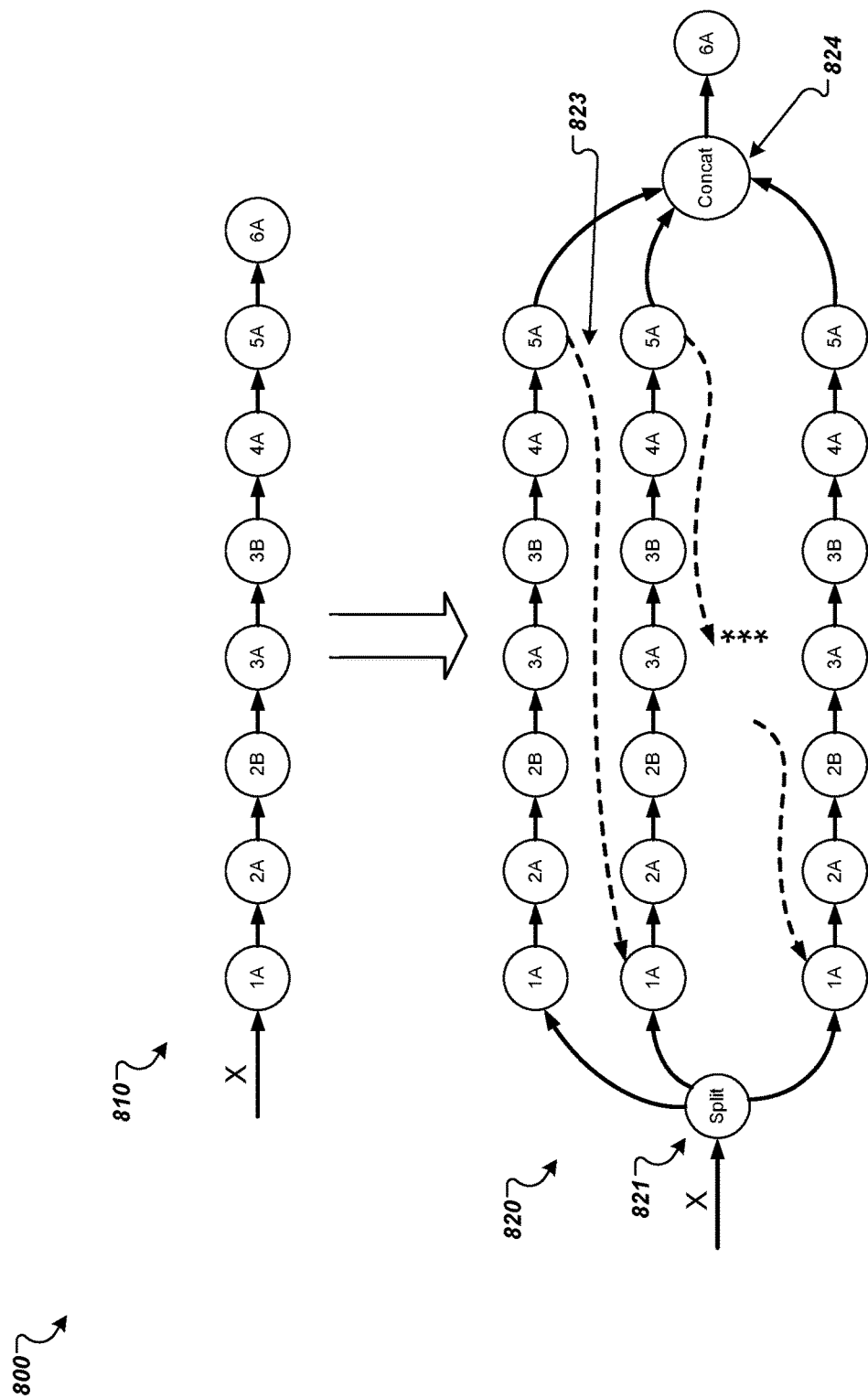
FIG. 8 is a diagram that illustrates another input graph of a machine learning model and another updated graph with improved locality.

Modifying the operations can also include adding an operation to split a tensor into multiple sub-tensors and including multiple iterations of one or more operations. For example, if the size of a tensor that will be input to an operation (or a sequence of operations) is too large to fit in faster memory, the improvement module 131 can add an operation that splits the tensor into multiple sub-tensors that each can fit into the faster memory. The improvement module 131 can also include after the split operation multiple iterations of the one or more operations, one for each of the sub-tensors. The improvement module 131 can also include a control dependency that transfers control from the last operation of each iteration to the first operation of the next iteration until the last iteration. The improvement module 131 can also include a concat operation that merges the sub-tensors output by each iteration into an output tensor that represents the output of the original one or more operations on the original input tensor. An example of this splitting and merging using multiple iterations of a sequence of operations is illustrated in FIG. 8 and described below.

In some implementations, the improvement module 131 generates an updated machine learning model 132 by adding annotations, instructions, and/or other control data that causes the machine learning model to store data output by operations in appropriate memories. For example, an updated machine learning model 131 can include, for each edge from one operation (e.g., operation A) to another operation (e.g., operation B), an annotation that specifies which memory to store the output of operation A that will be used by operation B. An annotation can also be used to pre-fetch data from a slower memory to a faster memory. For example, an annotation can be included at a particular operation to trigger the pre-fetching of data for another operation.

Each annotation can be associated with (e.g., assigned to) an operation or edge. The machine learning processor 140 can be configured to read the annotation for each operation or edge when executing the operation or transferring control or data based on the edge. The machine learning processor 140 can then perform the appropriate operation (e.g., store data in an appropriate memory, begin transferring data, transfer control to another operation, etc.) based on the annotation.

The improvement module 131 can generate an updated machine learning model 132 based on an input machine learning model 131 using a set of rules, one or more machine learning models, simulation(s) of the machine learning model, and/or other appropriate techniques. A set of rules can include rules that specify how the improvement module 131 is to modify the input machine learning model 112 based on data reuse patterns in the model 112. For example, a rule can specify that, if the capacity of the faster memory cannot fit the outputs of two operations, the improvement module 131 is to modify the input machine learning model 131 to store the data that will be used by another operation first in the faster memory and to store the data that will be used later in the slower memory. The rule can also specify that the improvement module 131 is to include control data (e.g., an operation or annotation) that causes the later used data to be pre-fetched at an appropriate time such that the data is stored in the faster memory prior to the data being used as input by another operation.

The set of rules can also specify priorities between data for storing in faster memory. For example, data that would be used earlier than other data can have a higher priority than the later used data. Similarly, data that would be shared among cores can have a higher priority for memory that is shared between the cores than other data.

The improvement module 131 can also simulate the execution of the machine learning model using a memory hierarchy for the machine learning processor 140 on which the model will be executed to determine when the capacity of the faster memory will be exceeded and/or the amount of time or number of operations between the time that output data is output by an operation and then used by another operation. The improvement module 131 can use this data to determine when to store data in slower memory, which data should be stored in the slower memory (e.g., the data that will be used later rather than earlier), and/or when to pre-fetch data. The improvement module 131 can then use this data (e.g., in combination with the set of rules) to modify the input machine learning model 112 to generate the updated machine learning model 132.

The improvement module 131 can use memory management techniques (e.g., software or graph transform managed techniques) to determine which data to store in which memories and update the machine learning model to schedule the storage of machine learning data accordingly. For example, the improvement module 131 can use page replacement techniques, such as the Belady's algorithm, to determine which data should be stored in the faster memory at any point in time and which data should be moved from the faster memory to slower memory to make room for other data. Using such a technique and the data of the machine learning model (e.g., a graph of the machine learning model) that represents data reuse patterns of the model, the improvement module 131 can determine which data should be stored in which memory at any point in time during the execution of the model. For example, in Belady's algorithm, data that will not be used for the longest amount of time can be moved from the faster memory to a slower memory so that other data that will be used sooner can be stored in the faster memory. As the improvement module 131 can determine when data output by each operation will be used next, the improvement module 131 can use memory management techniques to determine where to store the data output by each operation and update the machine learning model so that the data output by the machine learning model is stored in the appropriate memory.

The use of Belady's algorithm is not possible in typical hardware-managed caches. However, since future data access patterns are known for neural networks and other machine learning models that can be represented with a graph, Belady's algorithm can be used to select which data to move out of faster memory.

The improvement module 131 can also train a machine learning model to generate an updated machine learning model 132 based on an input machine learning model 112 and the characteristics of a memory hierarchy. For example, the improvement module 131 can use reinforcement learning techniques to learn ways to make the machine learning model faster. In a particular example, the improvement module 131 can use a machine learning model to run the input machine learning model 112 and measure the performance of the input machine learning model 112. The machine learning model can then apply graph transforms on the graph of the input machine learning model 112 to generate updated machine learning models. The machine learning model can then measure the performance of the update models and identify the update model with the best performance.

The improvement module 131 can also include, in an updated machine learning model 132 or other code used by a machine learning processor 140 to execute the machine learning model 132, data that causes the machine learning processor 140 to keep frequently used (e.g., used by at least a threshold number of operations) data in faster memory (e.g., in on-chip memory). For example, the improvement module 131 can include, in the updated machine learning model 132, data that causes the machine learning processor 140 to keep weights used in machine learning computations in on-chip memory. This enables faster loading of such data to compute units (e.g., cores).

If multiple cores on a same chip will use the same data, the improvement module 131 can include, in the updated machine learning model (or other code), data that causes the machine learning processor 140 to keep the data in on-chip memory. This enables faster loading of such data by each of the cores. This also allows the machine learning model to be partitioned across multiple cores within a chip. For example, the cores can communicate amongst each other through the on-chip memory.

Each memory in a memory hierarchy can be exposed to software (e.g., software for executing machine learning models) as addressable namespaces or named memory devices. To instruct the machine learning processor 140 which memory to store data output by an operation, the updated machine learning model 132 can specify, for at least some of the operations, the appropriate namespace or memory device. The software can use this data to store the data in the appropriate memory.

FIGS. 2-6 illustrate some example execution frameworks that include example memory hierarchies for memories that can be used by a machine learning processor to perform machine learning computations using machine learning models. As described above, the machine learning models can be updated (e.g., to improve locality in data placement and/or movement) based on data specifying the characteristics of the memory hierarchy that will be used to store machine learning data used by the machine learning processor when performing machine learning computations using the machine learning model. The memory hierarchies illustrated in FIGS. 2-6 are examples and the techniques for modifying machine learning models described herein can be applied to other memory hierarchies.

Example machine learning processors that can be used in the example execution frameworks include central processing units (CPUs), graphics processing units (GPUs) and/or tensor processing units (TPUs). For example, the execution frameworks can include one or more NVIDIA KEPLER K40 GPU accelerators, one or more NVIDIA PASCAL P100 GPUs, and/or one or more NIVDIA VOLTA V100 Tensor Core GPUs, and/or other appropriate processors capable of performing machine learning computations. The machine learning processors can be TPUs with fast on-chip memory that is an addressable namespace that is exposed to software, e.g., software executing machine learning models.

FIG. 2 is a block diagram of an example execution framework 200 for a machine learning processor 201. The execution framework 200 includes an example memory hierarchy 230 that includes two levels of memory, L1 memory 203 and main memory 204. The L1 memory 203 is on-chip memory that is integrated on the machine learning processor's chip (e.g., integrated circuit) with a processor core 202 of the machine learning processor 201. The core 202 is an individual processor of the chip that is configured to perform machine learning computations using one or more machine learning models. Some chips include multiple cores as described below.

The main memory 204 can be off-chip memory that is not integrated on the chip with the core 202 and L1 memory 203. Thus, the main memory 204 may be larger (e.g., have more storage capacity) than the L1 memory 203. As the L1 memory 203 is on-chip, the L1 memory 203 can have a much higher bandwidth than the main memory 204. However, due to the limited size of the L1 memory 203, some machine learning data may need to be stored in the main memory 204 until the data is going to be used by the core 202. In some implementations, the L1 memory 203 is static random-access memory (SRAM) and the main memory 204 is dynamic random-access memory (DRAM).

In this example, the core 202 can access both the main memory 204 and the L1 memory 203 directly over memory channels 211 and 212, respectively. The core 202 can also access the main memory 204 indirectly through the L1 memory 203 using memory channels 212 and 213. For example, this indirect access may be accomplished by moving data from the main memory 204 to the L1 memory 203 for access by the core 202. Moving data between the memories can be performed in the background, e.g., using direct memory access (DMA). In other examples, the memory channel 211 may be excluded, requiring the core 202 to access the main memory indirectly only.

FIG. 3 is a block diagram of another example execution framework 300 for a machine learning processor 301. In this example, the execution framework 300 includes a memory hierarchy 330 that includes three levels of memory, L1 memory 303, L2 memory 304, and main memory 305. The L1 memory 303 and the L2 memory 304 can be on-chip memories integrated on a chip with the core 302. In another example, the L1 memory 303 can be on-chip while the L2 memory 304 is off-chip but tightly integrated with the chip (e.g., 3D stacked or other appropriate fast chip-interconnect technology). The main memory 305 is off-chip memory that is not integrated on the chip with the core 302, but may also be tightly integrated with the chip.

The L1 memory 303 can have the highest bandwidth of the memories 303-305, but the least amount of storage capacity of the memories 303-305. The L2 memory 304 can have bandwidth that is lower than the bandwidth of the L1 memory 303, but that is higher than the bandwidth of the main memory 305. The main memory 305 can have the highest amount of storage capacity of the three memories 303-305. In some implementations, the L1 memory 303 and the L2 memory 304 are SRAMs and the main memory 305 is DRAM. In another example, the L1 memory 303 is SRAM and the L2 memory 304 and the main memory 305 are DRAMs.

In this example, large data that is not able to fit in the L1 memory 303 or the L2 memory 304 can be stored in the main memory 305. In addition, data that may not be used for some time (e.g., for at least a threshold amount of time or a threshold number of operations) can be stored in the main memory 305 and pre-fetched to the L1 memory 303 of the L2 memory 304 prior to being used. As described above, moving data between the memories 303-305 can be performed in the background, e.g., using DMA.

The core 302 can access the main memory 305, the L2 memory 304, and the L1 memory 303 directly over memory channels 311, 312, and 313, respectively. The core 302 can also access the main memory 305 indirectly through the L2 memory 304 using memory channels 312 and 315, or through the L1 and L2 memories using memory channels 313, 314, and 315. As described above, indirect access can involve moving the data between the memories. Similarly, the core 302 can access the L2 memory 304 indirectly through the L1 memory 303 using memory channels 313 and 314. The memory channel 311 that bypasses the L1 memory 303 and the L2 memory 304 can be useful so that smaller more-frequently accessed data is not overwritten and remains available for fast access from the main memory 305.

In other examples, the memory hierarchy 330 can include a direct memory channel between the L1 memory 303 and the main memory 305, allowing the core 302 to access the main memory 305 via the L1 memory 303, but without going through the L2 memory 304. In another example, the L1 memory 303 and the L2 memory 304 can share a memory channel to/from the main memory 305.

The machine learning processors 201 and 301 of FIGS. 2 and 3 can include multiple cores that each have the same (or different memory hierarchies). For example, the machine learning processor 201 can have two cores that each have their own L1 memory and access to a shared main memory. In another example, the machine learning processor 301 can include three cores that share the same L1, L2, and main memories.

Figures 4, 5:
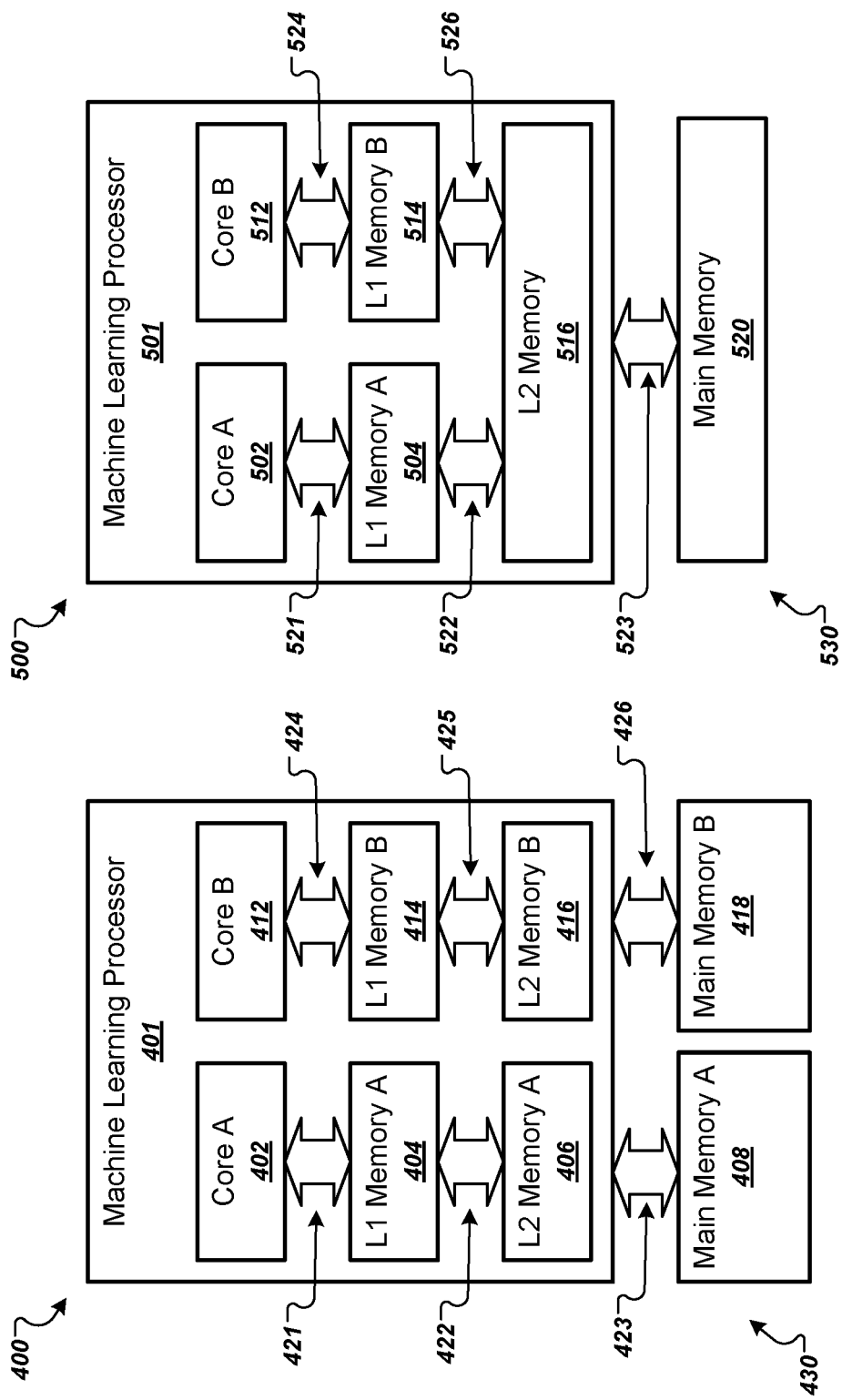
FIG. 4 is a block diagram of another example execution framework for a machine learning processor.
FIG. 5 is a block diagram of another example execution framework for a machine learning processor.

FIG. 4 is a block diagram of another example execution framework 400 for a machine learning processor 401. The example machine learning processor 401 includes two cores 402 and 412. In this example, the execution framework 400 includes a memory hierarchy 430 that includes, for each core 402 and 412, a separate memory hierarchy that includes dedicated L1 memory, dedicated L2 memory, and dedicated main memory. For example, the core 402 can access its L1 memory 404 directly through a memory channel 421. The core 402 can also access its L2 memory 406 indirectly through the L1 memory 404 and a memory channel 422, and further access its main memory 408 through memory channel 423. The memory hierarchy 430 could also include direct memory channels between the core 402 and the L2 memory 406 and/or between the core 402 and the main memory 408.

The L1 memory 404 can have the highest bandwidth of the memories 404, 406, and 408, but the least amount of storage capacity of the memories 404, 406, and 408. The L2 memory 406 can have bandwidth that is lower than the bandwidth of the L1 memory 404, but that is higher than the bandwidth of the main memory 408. The main memory 408 can have the highest amount of storage capacity of the three memories 404, 406, and 408. For example, the L1 memory 404 can be on-chip memory, the L2 memory 406 can be on-chip memory or off-chip but tightly integrated with the chip, and the main memory 408 can be off-chip memory.

Similarly, the core 412 can access its L1 memory 414 directly through a memory channel 424. The core 412 can also access its L2 memory 416 indirectly through the L1 memory 414 and a memory channel 425, and further access its shared main memory 418 through memory channel 426. The memory hierarchy 430 could also include direct memory channels between the core 412 and the L2 memory 416 and/or between the core 412 and the main memory 418.

The L1 memory 414 can have the highest bandwidth of the memories 414, 416, and 418, but the least amount of storage capacity of the memories 414, 416, and 418. The L2 memory 416 can have bandwidth that is lower than the bandwidth of the L1 memory 414, but that is higher than the bandwidth of the main memory 418. The main memory 418 can have the highest amount of storage capacity of the three memories 414, 416, and 418. For example, the L1 memory 414 can be on-chip memory, the L2 memory 416 can be on-chip memory or off-chip but tightly integrated with the chip, and the main memory 418 can be off-chip memory.

In some implementations, the L1 memories 404 and 414 and the L2 memories 406 and 416 are SRAMs and the main memories 408 and 418 are DRAMs. In another example, the L1 memories 404 and 414 are SRAMs and the L2 memories 406 and 416 and the main memories 408 and 418 are DRAMs.

Although the example machine learning processor 401 includes two cores 402 and 412 with separate memory hierarchies, the machine learning processor 401 can include other appropriate quantities of cores (e.g., four, eight, etc.) each with their own memory hierarchies. Some of the memories can be shared between the cores. For example, rather than having dedicated L2 memory and main memory, these memories can be shared as illustrated in FIG. 5.

FIG. 5 is a block diagram of another example execution framework 500 for a machine learning processor 501. The example machine learning processor 501 includes two cores 502 and 512. In this example, the execution framework 500 includes a memory hierarchy 530 that includes, for each core 502 and 512, a separate memory hierarchy that includes dedicated L1 memory and shared L2 and main memories. For example, the core 502 can access its L1 memory 504 directly through a memory channel 521. The core 502 can also access shared L2 memory 516 indirectly through the L1 memory 504 and a memory channel 522, and further access shared main memory 520 through shared memory channel 523. The memory hierarchy 530 could also include direct memory channels between the core 502 and the L2 memory 516 and/or between the core 502 and the main memory 520.

Similarly, the core 512 can access its L1 memory 514 directly through a memory channel 524. The core 512 can also access shared L2 memory 516 indirectly through the L1 memory 514 and a memory channel 526, and further access shared main memory 520 through shared memory channel 523. The memory hierarchy 530 could also include direct memory channels between the core 512 and the L2 memory 516 and/or between the core 512 and the main memory 520.

The L1 memories 504 and 514 can have a higher bandwidth than the L2 memory 516 and the main memory 520. However, the L1 memories 504 and 514 can each have less storage capacity than the L2 memory 516 and the main memory 520. The L2 memory 516 can have bandwidth that is lower than the bandwidth of the L1 memories 504 and 514, but that is higher than the bandwidth of the main memory 520. The main memory 520 can have the highest amount of storage capacity of the memories 504, 514, 516, and 520. For example, the L1 memories 504 and 514 can be on-chip memories, the L2 memory 516 can be on-chip memory or off-chip but tightly integrated with the chip, and the main memory 520 can be off-chip memory.

In some implementations, the L1 memories 504 and 514 and the L2 memory 516 are SRAMs and the main memory 520 is a DRAM. In another example, the L1 memories 504 and 514 are SRAMs and the L2 memory 516 and the main memory 520 are DRAMs.

In this example, the L2 memory 516 and the main memory 520 are shared by the cores 502 and 512. Machine learning data used by both cores 502 and 512 can be stored in the L2 memory 516 and/or the main memory 520. For example, weights or bias values used by both cores 502 and 512 can be stored in the L2 memory 516 and/or the main memory 520. The cores 502 and 512 can also share other machine learning data (e.g., outputs of operations) with each other by storing the data in the L2 memory 516 and/or the main memory 520.

Although the example machine learning processor 501 includes two cores 502 and 512 with separate and shared memories, the machine learning processor 501 can include other appropriate quantities of cores (e.g., four, eight, etc.) each with their own memory hierarchies. For example, a machine learning processor can include four cores that each have their own L1 memory, but share common L2 and main memories.

Figure 6:
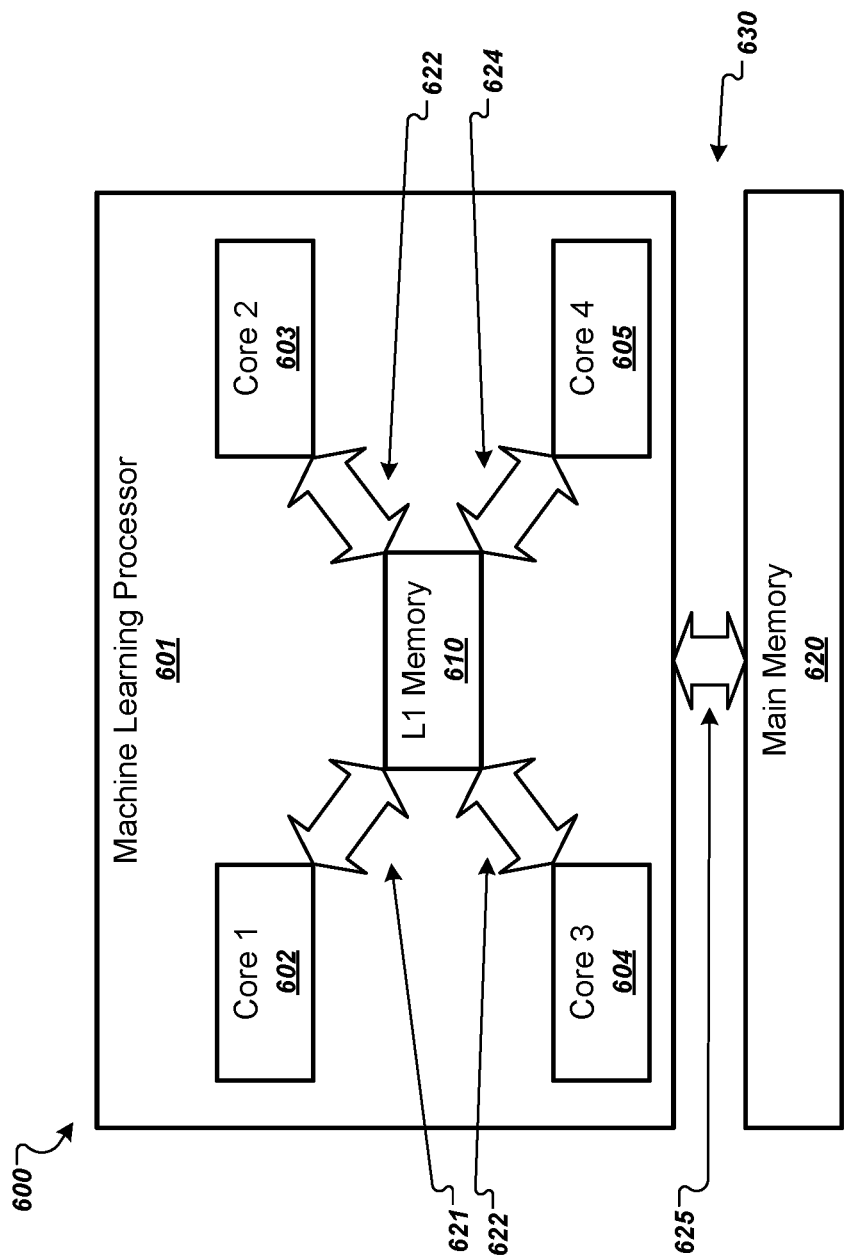
FIG. 6 is a block diagram of another example execution framework for a machine learning processor.

FIG. 6 is a block diagram of another example execution framework 600 for a machine learning processor 601. The example machine learning processor 601 includes four cores 602-605 that share a common memory hierarchy 630 that includes L1 memory 610 and main memory 620. Although not shown, the four cores 602-605 could also share L2 memory and/or other memory.

In this example, each core 602-605 has an individual memory channel 621-624 for accessing the L1 memory 610. The cores 602-605 share a memory channel 625 to the main memory 620. In other examples, the each core 602-605 can have a dedicated memory channel to the main memory 620 and/or a shared channel to the L1 memory 610.

The L1 memory 610 can have a higher bandwidth than the main memory 620, but less storage capacity than the main memory 620. For example, the L1 memory 610 can be on-chip memory while the main memory 620 can be off-chip memory. In some implementations, the L1 memory 601 is SRAM and the main memory 620 is DRAM.

Figure 7:
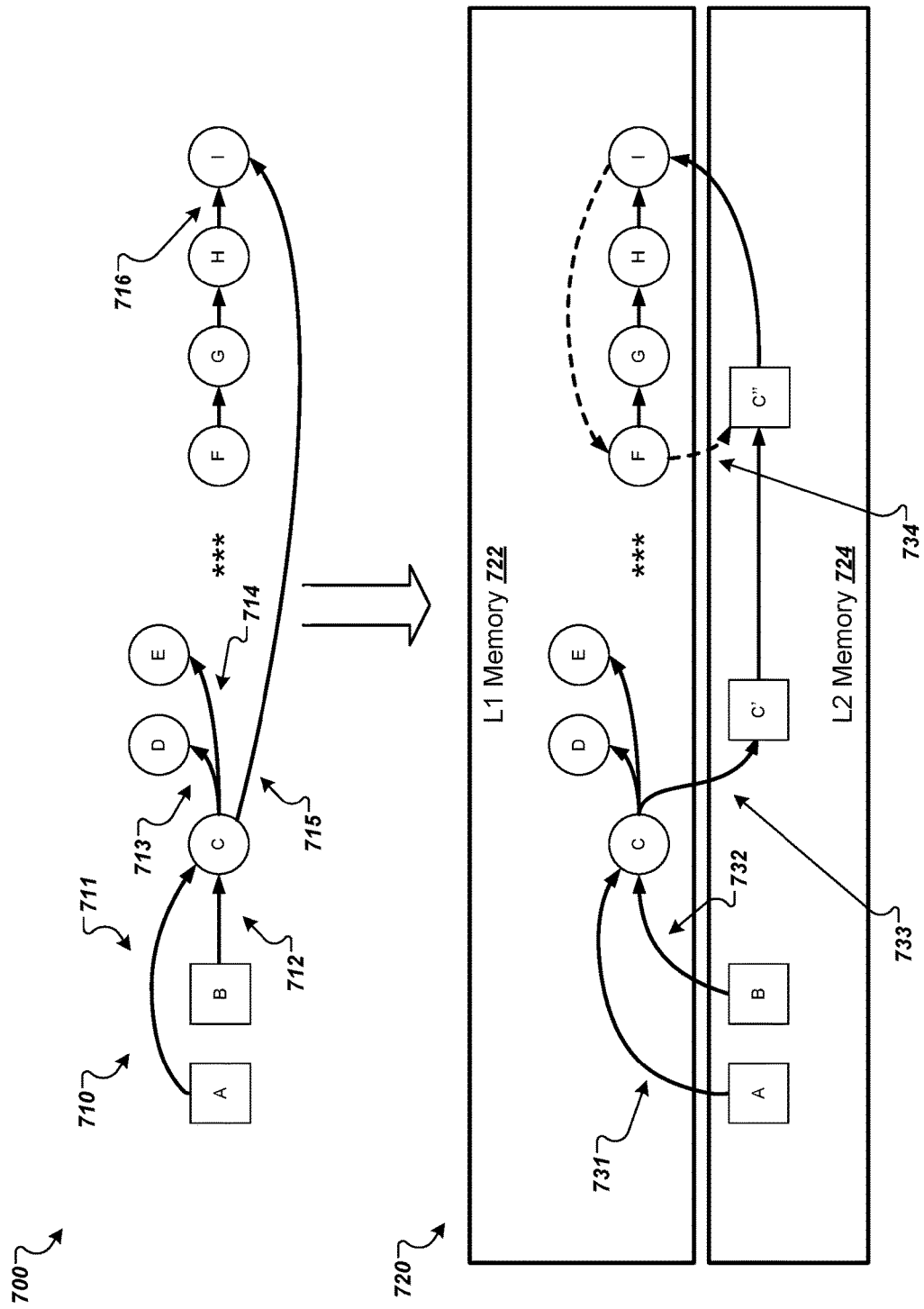
FIG. 7 is a diagram that illustrates an input graph of a machine learning model and an updated graph with improved locality.

FIG. 7 is a diagram 700 that illustrates an input graph 710 of a machine learning model and an updated graph 720 with improved locality relative to the input graph 710. The input graph 710 is a portion of a larger graph that includes operations (represented by nodes) and control and data dependencies (represented by edges between the nodes). The input graph 710 includes operations C-I with edges (arrows) between the operations that represents control and/or data dependencies between the operations. For example, operation C uses input data A and input data B. The input data A and/or input data B can be machine learning data input to the machine learning model or output by another operation that is not shown in FIG. 7. In this example, operation C may use the input data A and input data B in performing a machine learning computation.

The input graph 710 includes an edge 711 between input data A and operation C and an edge 712 between input data B and operation C. These edges 711 and 712 represent a data dependency for operation C. That is, operation C is dependent on input data A and input data B. Similarly, operations D, E, and I are dependent on operation C being performed first, as represented by edges 713, 714, and 715, respectively. In this example, operations D, E, and I use the data output by operation C to perform machine learning computations. Thus, the edge 713 represents control and data dependencies between operation C and operation D. Similarly, the edges 714 and 715 represent control and data dependencies between operation C and I, respectively.

When a machine learning processor executes the machine learning model represented by the graph 710, the edges cause the machine learning processor to transition from operation to operation in order based on the direction of the edge. For example, the edge 711 causes the machine learning processor to perform operation C after input data A becomes available. However, the edge 712 requires that operation C not be performed until input data B is also available. This represents the data dependency of these edges. Similarly, the edge 713 causes the machine learning processor to perform operation D after operation C is performed. The edges 715 and 716 causes the machine learning processor to perform operation I after both operation C and operation H have been performed.

The updated graph 720 is updated relative to the input graph 710. An improvement module, e.g., the improvement module 131 of FIG. 1, can generate the updated graph 720 based on characteristics of a memory hierarchy for a machine learning processor on which the machine learning model is going to be deployed. In this example, the memory hierarchy includes L1 memory 722 and L2 memory 724. The L1 memory can be faster than the L2 memory, but have less data storage capacity than the L2 memory.

The improvement module can determine, based on the input graph 710, reuse patterns of machine learning data output by the operations and modify the input graph 710 to generate the updated graph 720 based on the reuse patterns and the characteristics of the memory hierarchy. For example, the improvement module can determine, for each set of output data output by each operation, a number of operations that will be executed (and/or an estimated amount of time that will elapse) before the data is used again. The improvement module can determine which memory to store the data in and when to pre-fetch the data to the faster memory based on when each operation will be executed, the number of operations (and/or time) before the data will be used, and the storage capacities of the memories.

The updated graph 720 includes different control and data dependencies and data specifying which memory to store outputs of operations. For example, the updated graph 720 indicates that input data A and B is stored in L2 memory 724. The updated graph includes edges 731 and 732 that causes the machine learning processor to pre-fetch the input data A and B to L1 memory 722 for input to operation C.

The updated graph 720 also specifies that the output data from operation C is used as an input to operations D and E, which matches the input graph 710. The updated graph 720 includes a new edge 733 that causes the machine learning processor to also store the output data from operation C in L2 memory 724 (as data C') as the output data will not be used again until operation I.

The updated graph 720 includes another new edge between operation F and the output data C" (which can be the same as the output data C'). The edge 734 represents a control dependency that causes the machine learning processor to pre-fetch the output data C" from L2 memory 724 to L1 memory 722. For example, the output data from operation C can be pre-fetched to L1 memory 722 for use by operation I. The output data can be pre-fetched prior to operation I being executed to reduce the latency that would otherwise occur transferring the data from L2 memory 724 to operation I after operation H has been executed. Instead, the updated graph 720 includes an edge 734 that represents a control dependency between operation F and pre-fetching the output data C". In this example, after operation F is executed, the output data C" that is stored in L2 memory 724 is pre-fetched to L1 memory 722. The data can be transferred in the background (e.g., using DMA) while operations G and H are being executed by the machine learning processor.

The improvement module can determine when (e.g., which operation to use as a trigger) to initiate the pre-fetching based on the amount of data that will need to be transferred (e.g., based on an estimated amount of time for the transfer) and the estimated amount of time that it will take the machine learning processor to perform the operations that precede operation I. In this way, the improvement module can ensure that the data is transferred prior to operation I being executed, but without unnecessarily using faster L1 memory 722 that may be used to store other data (e.g., data between operations F and G).

In some implementations, the updated graph 720 can include annotations that instruct the machine learning processor which memory to store the data and when to transfer the data rather than being operations of the machine learning model itself, e.g., in addition to edges that represent data and/or control dependencies. The annotations can be included in the updated graph 720 or as part of other code executed by the machine learning processor.

FIG. 8 is a diagram 800 that illustrates another input graph 810 of a machine learning model and another updated graph 820 with improved locality. In this example, the input graph 810 includes a sequence of operations 1A-6A that perform machine learning computations using a tensor X. The sequence of operations 1A-6A can be part of a larger graph. For example, the sequence of operations 1A-6A can be a first sequence of operations and the tensor X can be an input tensor to the machine learning model. In another example, the sequence of operations 1A-6A can be executed after other operations and the tensor X can be an intermediate tensor (e.g., different from the input tensor due to previous operations) or a partial tensor (e.g., a portion of the input tensor).

In this example, the tensor X may be too large to store in the fastest memory (e.g., L1 memory) of a memory hierarchy for a machine learning processor on which the machine learning model will be executed. The improvement module can include, in the updated graph 820, a batch split operation 821 that splits the tensor X into multiple sub-tensors. The improvement module can also include, in the updated graph, multiple iterations of the sequence of operations 1A-5A. Each iteration of the sequence of operations 1A-5A can be performed on one of the sub-tensors.

For example, consider that the tensor X has a data size that is five times that of the L1 memory. The improvement module can include, in the updated graph 820, a batch split operation that splits the tensor into five sub-tensors that can each fit in L1 memory. In addition, the improvement module can include, in the updated graph 820, five iterations of the sequence of operations 1A-5A, one for each sub-tensor. In this way, the output of each operation can be stored in the L1 memory for the next operation until each operation in the sequence of operations 1A-5A is performed for the sub-tensor.

By keeping the data in L1 memory, the machine learning computations performed by each operation 1A-5A can be performed much faster than if the operations 1A-5A were performed on the full tensor X using the input graph 810. For example, in the input graph, at least some of the input data for each operation would have to be retrieved from a slower memory causing the machine learning processor to have to wait for the data at each operation.

The improvement module can also consider the size of the data output by each operation in the sequence of operations when determining how many sub-tensors to generate from the tensor X and how many iterations of the sequence of operations to include in the updated graph 820. For example, if the output of one of the operations would exceed the capacity of L1 memory even though the sub-tensor input to the operation 1A would fit in L1 memory, the improvement module can split the tensor X into more sub-tensors such that the data output by each operation can fit in the L1 memory.

The improvement module can also generate and include in the updated graph 820 a control dependency 823 after each iteration of operation 5A prior to the last iteration of operation 5A. The control dependency 823 causes the machine learning processor to transition control to the next iteration of the sequence of operations 1A-5A, starting with the next iteration of operation 1A. In this way, the sequence of operations 1A-5A can be performed on each sub-tensor of the tensor X.

The improvement module can also generate and include in the updated graph 820 a concat operation 824 that can concatenate the output data of each iteration of the sequence of operations 1A-5A into an output tensor. The concat operation 824 can merge the data (e.g., tensors) output by 5A for each sub-tensor that was generated by the batch split operation 821. The output tensor can then be provided as input to operation 6A.

Figure 9:
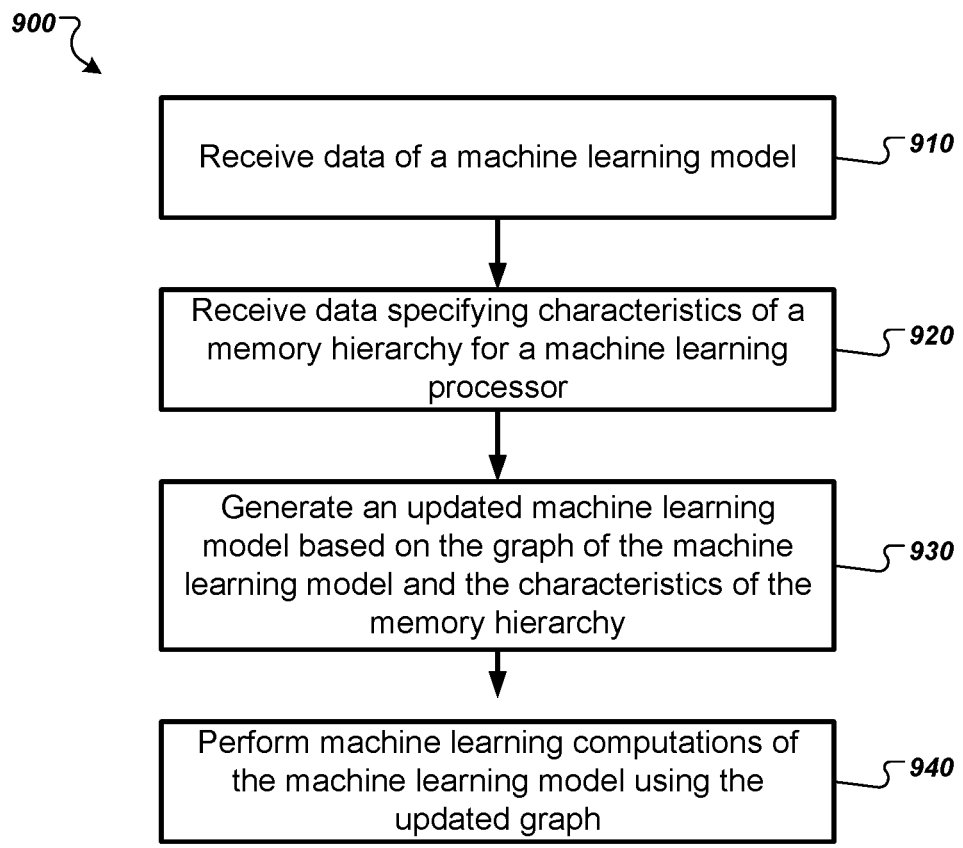
FIG. 9 is a flow diagram that illustrates an example process for generating an updated machine learning model with improved locality and using the updated machine learning model to perform machine learning computations.

FIG. 9 is a flow diagram that illustrates an example process 900 for generating an updated graph with improved locality and using the updated graph to perform machine learning computations. The process 900 can be performed by the machine learning system 120 of FIG. 1.

Data of a machine learning model is received (910). The data can represent operations of the machine learning model and data dependencies between the operations. For example, the data can include a graph that includes a node for each operation and edges between operations. Each edge can represent a data dependency between two operations connect by the edge. For example, an edge from a first operation to a second operation can indicate that the first operation is performed before the second operation and that the second operation uses data output by the first operation.

Data specifying characteristics of a memory hierarchy for a machine learning processor is received (920). The machine learning processor can be a processor on which the machine learning model is going to be deployed. The memory hierarchy can include multiple levels of memories for storing machine learning data used by the machine learning processor when performing machine learning computations using the machine learning model.

Each level of memories can have different characteristics from each other level. As described above, the characteristics of each memory level can include a data storage capacity of the memory and a memory bandwidth of the memory. The characteristics of each memory can include characteristics of memory channels between the processor (e.g., a processor core) and the memory, such as direct or indirect, shared or dedicated, speed, etc.

An updated machine learning model is generated based on the graph of the machine learning model and the characteristics of the memory hierarchy (930). For example, as described above, an improvement module can use a set of rules, one or more machine learning models, and/or simulations of an input machine learning model to generate an updated machine learning model with improved locality.

As described above, generating the updated machine learning model can include selecting, for at least a portion of the operations, one of the memories in the memory hierarchy to store outputs of the operation based on when the outputs will be used as inputs to another operation. For example, if the faster memory cannot store the outputs of the operation and outputs of other operations that will be executed between the time at which the operation is executed and the output of the operation is used by another operation, the outputs of the operation can be stored in slower memory and later pre-fetched to faster memory.

Generating the updated machine learning model can include determining that output data for a first operation is to be stored in a first memory (e.g., slower memory) of the multiple memories of the memory hierarchy based on when the output data for the operation will be used as input by a second operation. In response, the improvement module can include, in the updated machine learning model, first control data (e.g., an operation, annotation, etc.) that causes the machine learning processor to store the output data for the first operation in the first memory after the output data is generated by the first operation. The improvement module can also include, in the updated machine learning model, second control data that causes the machine learning processor to transfer (e.g., pre-fetch) the output data from the first memory to the second memory (e.g., faster memory) prior to the output data being used as input to the second operation.

The second control data can cause the machine learning processor to transfer the output data from the first memory to the second memory in response to a third operation being executed. For example, the second control data can include a control dependency between the third operation and an operation that causes the transfer of the output data.

The improvement module can determine which memory of the multiple memories to store output data for a first operation based on a number of operations that will be executed between the first operation and a second operation that will use the output data to perform a machine learning computation. For example, if the number of operations exceeds a threshold number of operations, the output data can be stored in slower memory. If the number of operations does not exceed the threshold, the output data can be stored in faster memory.

The improvement module can determine which memory of the multiple memories to store output data for a first operation based on an estimated duration of time between when the first operation will be executed and the second operation will be executed. For example, if the duration of time exceeds a threshold duration, the output data can be stored in slower memory. If the duration of time does not exceed the threshold, the output data can be stored in faster memory.

Generating the updated machine learning model can include determining that input data (e.g., a tensor) for a particular sequence of operations of the machine learning model requires more data storage capacity than a particular memory (e.g., the fastest memory) of the multiple memories. In response, the improvement module can include, in the updated machine learning model, multiple sequences of operations that include a same sequence of operations as the particular sequence of operations. The improvement module can also include, in the updated machine learning model, first control data that causes the machine learning processor to split the input data into multiple portions of data (e.g., into sub-tensors), second control data that causes the machine learning processor to assign each portion of data to a respective sequence of operations of the multiple sequence of operations, and third control data (e.g., control dependencies) that causes the machine learning processor to perform the multiple sequences of operations in series. An example of splitting input data into multiple portions and including multiple sequence of operations in an updated machine learning model is illustrated in FIG. 8 and described above.

Machine learning computations are performed using the updated machine learning model (940). For example, the updated machine learning model can be deployed on the machine learning processor. The machine learning processor can train the updated machine learning model using training data. For example, the machine learning processor can train the machine learning model to classify input data. The machine learning processor can then use the trained machine learning model to perform machine learning computations, e.g., to classify other input data.

As described above, the operations of the machine learning model can include those that are necessary to perform a forward pass through the machine learning model, e.g., to compute an inference through the machine learning model. These operations can include, for example, matrix multiplication operations and/or convolution operations performed by the layers of a neural network. The operations can also include those that are necessary to perform an iteration of a training process to train the machine learning model. These operations can include operations necessary to perform a forward pass through the machine learning model and also operations necessary to perform a backward pass through the machine learning model, i.e., backpropagation operations necessary to determine gradients with respect to the weights or parameters of the machine learning model.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for improving locality of machine learning models, the method performed by data processing apparatus, the method comprising:

receiving data of a machine learning model, the data representing operations of the machine learning model;

receiving data specifying characteristics of a memory hierarchy for one or more machine learning processors on which the machine learning model is going to be deployed, the memory hierarchy including multiple memories for storing machine learning data used by the one or more machine learning processors when performing machine learning computations using the machine learning model, the characteristics including a data storage capacity of each memory and a memory bandwidth of each memory, wherein at least one of the memories has a different memory bandwidth than at least one other memory;

generating, based on the data of the machine learning model and the characteristics of the memory hierarchy, an updated machine learning model, the generating comprising:

determining that output data of a given operation of the machine learning model should be stored in a highest bandwidth memory of the multiple memories based on the machine learning model;

determining that the output data of the given operation has a data size that is larger than a data storage capacity of the highest bandwidth memory; and in response to determining that the output data of the given operation has the data size that is larger than the data storage capacity of the highest bandwidth memory adding, to the updated machine learning model, one or more operations for splitting the output data into multiple portions of output data such that each portion of output data has a data size that is less than or equal to the data storage capacity of the highest bandwidth memory; and performing machine learning computations using the updated machine learning model.

2. The method of claim 1, wherein:
the output data comprises a tensor; and
the one or more operations for splitting the output data into the multiple portions of the output data comprises an split operation for splitting the tensor into multiple sub-tensors.

3. The method of claim 2, wherein generating the updated machine learning model comprises adding, to the machine learning model, a respective sequence of operations for each sub-tensor, wherein each respective sequence of operations corresponds to a particular sequence of operations to be performed on the tensor in the machine learning model.

4. The method of claim 3, wherein generating the updated machine learning model comprises adding, to the machine learning model, a respective control dependency at a final operation of one or more of the respective sequences of operations that shifts control from the respective sequence of operations to a first operation in a next respective sequence of operations.

5. The method of claim 4, wherein generating the updated machine learning model comprises modifying the machine learning model to store the sub-tensor for a given sequence of operations on the highest bandwidth memory while the given sequence of operations is being performed.

6. The method of claim 2, wherein generating the updated machine learning model comprises adding, to the updated machine learning model, a concat operation configured to merge the multiple sub-tensors into an output tensor.

7. The method of claim 1, wherein generating the updated machine learning model comprises modifying, for each of one or more of the operations of the machine learning model, which memory of the multiple memories of the one or more machine learning processors that outputs of the operation are stored in based on the characteristics of the memory hierarchy for the one or more machine learning processors.

8. A machine learning computations system, comprising:
a data processing apparatus; and
a memory storage apparatus in data communication with the data processing apparatus, the memory storage apparatus storing instructions executable by the data processing apparatus and that upon such execution cause the data processing apparatus to perform operations comprising:
receiving data of a machine learning model, the data representing operations of the machine learning model;
receiving data specifying characteristics of a memory hierarchy for one or more machine learning processors on which the machine learning model is going to be deployed, the memory hierarchy including multiple memories for storing machine learning data used by the one or more machine learning processors when performing machine learning computations using the machine learning model, the characteristics including a data storage capacity of each memory and a memory bandwidth of each memory, wherein at least one of the memories has a different memory bandwidth than at least one other memory;
generating, based on the data of the machine learning model and the characteristics of the memory hierarchy, an updated machine learning model, the generating comprising:
determining that output data of a given operation of the machine learning model should be stored in a highest bandwidth memory of the multiple memories based on the machine learning model;
determining that the output data of the given operation has a data size that is larger than a data storage capacity of the highest bandwidth memory; and
in response to determining that the output data of the given operation has the data size that is larger than the data storage capacity of the highest bandwidth memory adding, to the updated machine learning model, one or more operations for splitting the output data into multiple portions of output data such that each portion of output data has a data size that is less than or equal to the data storage capacity of the highest bandwidth memory; and
performing machine learning computations using the updated machine learning model.

9. The system of claim 8, wherein:
the output data comprises a tensor; and
the one or more operations for splitting the output data into the multiple portions of the output data comprises an split operation for splitting the tensor into multiple sub-tensors.

10. The system of claim 9, wherein generating the updated machine learning model comprises adding, to the machine learning model, a respective sequence of operations for each sub-tensor, wherein each respective sequence of operations corresponds to a particular sequence of operations to be performed on the tensor in the machine learning model.

11. The system of claim 10, wherein generating the updated machine learning model comprises adding, to the machine learning model, a respective control dependency at a final operation of one or more of the respective sequences of operations that shifts control from the respective sequence of operations to a first operation in a next respective sequence of operations.

12. The system of claim 11, wherein generating the updated machine learning model comprises modifying the machine learning model to store the sub-tensor for a given sequence of operations on the highest bandwidth memory while the given sequence of operations is being performed.

13. The system of claim 9, wherein generating the updated machine learning model comprises adding, to the updated machine learning model, a concat operation configured to merge the multiple sub-tensors into an output tensor.

14. The system of claim 8, wherein generating the updated machine learning model comprises modifying, for each of one or more of the operations of the machine learning model, which memory of the multiple memories of the one or more machine learning processors that outputs of the operation are stored in based on the characteristics of the memory hierarchy for the one or more machine learning processors.

15. A non-transitory computer storage medium encoded with a computer program, the program comprising instructions that when executed by one or more data processing apparatus cause the data processing apparatus to perform operations comprising:
receiving data of a machine learning model, the data representing operations of the machine learning model;
receiving data specifying characteristics of a memory hierarchy for one or more machine learning processors on which the machine learning model is going to be deployed, the memory hierarchy including multiple memories for storing machine learning data used by the one or more machine learning processors when performing machine learning computations using the machine learning model, the characteristics including a data storage capacity of each memory and a memory bandwidth of each memory, wherein at least one of the memories has a different memory bandwidth than at least one other memory;

generating, based on the data of the machine learning model and the characteristics of the memory hierarchy, an updated machine learning model, the generating comprising:
- determining that output data of a given operation of the machine learning model should be stored in a highest bandwidth memory of the multiple memories based on the machine learning model;
- determining that the output data of the given operation has a data size that is larger than a data storage capacity of the highest bandwidth memory; and
- in response to determining that the output data of the given operation has the data size that is larger than the data storage capacity of the highest bandwidth memory adding, to the updated machine learning model, one or more operations for splitting the output data into multiple portions of output data such that each portion of output data has a data size that is less than or equal to the data storage capacity of the highest bandwidth memory; and performing machine learning computations using the updated machine learning model.

16. The non-transitory computer storage medium of claim 15, wherein:
the output data comprises a tensor; and
the one or more operations for splitting the output data into the multiple portions of the output data comprises an split operation for splitting the tensor into multiple sub-tensors.

17. The non-transitory computer storage medium of claim 16, wherein generating the updated machine learning model comprises adding, to the machine learning model, a respective sequence of operations for each sub-tensor, wherein each respective sequence of operations corresponds to a particular sequence of operations to be performed on the tensor in the machine learning model.

18. The non-transitory computer storage medium of claim 17, wherein generating the updated machine learning model comprises adding, to the machine learning model, a respective control dependency at a final operation of one or more of the respective sequences of operations that shifts control from the respective sequence of operations to a first operation in a next respective sequence of operations.

19. The non-transitory computer storage medium of claim 18, wherein generating the updated machine learning model comprises modifying the machine learning model to store the sub-tensor for a given sequence of operations on the highest bandwidth memory while the given sequence of operations is being performed.

20. The non-transitory computer storage medium of claim 16, wherein generating the updated machine learning model comprises adding, to the updated machine learning model, a concat operation configured to merge the multiple sub-tensors into an output tensor.

* * * * *